(12) United States Patent
Miller, II et al.

(10) Patent No.: US 11,994,464 B2
(45) Date of Patent: May 28, 2024

(54) ANALOG SIGNAL PROCESSING FOR A LIGHTWEIGHT AND COMPACT LASER-BASED TRACE GAS SENSOR

(71) Applicant: SeekOps Inc., Austin, TX (US)

(72) Inventors: Victor Alexander Miller, II, Austin, TX (US); Brendan James Smith, Lakeway, TX (US)

(73) Assignee: SeekOps Inc., Austin, TX (US)

( * ) Notice: Subject to any disclaimer, the term of this patent is extended or adjusted under 35 U.S.C. 154(b) by 0 days.

(21) Appl. No.: 17/601,538

(22) PCT Filed: Apr. 1, 2020

(86) PCT No.: PCT/US2020/026228
§ 371 (c)(1),
(2) Date: Oct. 5, 2021

(87) PCT Pub. No.: WO2020/206006
PCT Pub. Date: Oct. 8, 2020

(65) Prior Publication Data
US 2022/0178821 A1  Jun. 9, 2022

Related U.S. Application Data

(60) Provisional application No. 62/829,737, filed on Apr. 5, 2019.

(51) Int. Cl.
*G01N 21/39* (2006.01)
(52) U.S. Cl.
CPC ....... *G01N 21/39* (2013.01); *G01N 2201/125* (2013.01)

(58) Field of Classification Search
CPC ............. G01N 21/39; G01N 2201/125; G01N 2201/0221; G01N 2201/12; G01J 3/0264; G01J 3/28; G01J 3/42
(Continued)

(56) References Cited

U.S. PATENT DOCUMENTS 3,780,566 A  12/1973  Smith et al.
4,135,092 A  1/1979  Milly
(Continued)

FOREIGN PATENT DOCUMENTS

AU  3401499 A  11/1999
CN  104458588 A  3/2015
(Continued)

OTHER PUBLICATIONS

International Search Report and Written Opinion for PCT/US20/26228 dated Jul. 1, 2020.
(Continued)

*Primary Examiner* — Md M Rahman
(74) *Attorney, Agent, or Firm* — Concept IP LLP; Michael Zarrabian

(57) ABSTRACT

Systems, devices, and methods for a trace-gas sensor configured to generate a raw detector signal (118) based on a gas sample; an analog processing configured to filter, amplify, lock-in, and/or normalize the generated raw detector signal; analog to digital converters configured to convert the filtered and amplified detector signal to a digital signal; and a drive computer configured to: receive the converted digital signal from the analog to digital converters; and apply a spectroscopic model to the received digital signal to extract one or more properties of the gas sample.

20 Claims, 10 Drawing Sheets

(58) Field of Classification Search
USPC .......................................................... 356/300
See application file for complete search history.

(56) References Cited

U.S. PATENT DOCUMENTS

| | | |
|---|---|---|
| 4,233,564 A | 11/1980 | Kerbel |
| 4,507,558 A | 3/1985 | Bonne |
| 4,988,833 A | 1/1991 | Lai |
| 5,047,639 A | 9/1991 | Wong |
| 5,075,619 A | 12/1991 | Said |
| 5,173,749 A | 12/1992 | Tell et al. |
| 5,291,265 A | 3/1994 | Kebabian |
| 5,317,156 A | 5/1994 | Cooper et al. |
| 5,822,058 A | 10/1998 | Adler-Golden et al. |
| 6,064,488 A | 5/2000 | Brand et al. |
| 6,509,566 B1 | 1/2003 | Wamsley et al. |
| 6,549,630 B1 | 4/2003 | Bobisuthi |
| 7,800,751 B1 | 9/2010 | Silver et al. |
| 7,833,480 B2 | 11/2010 | Blazewicz et al. |
| 8,294,899 B2 | 10/2012 | Wong |
| 8,451,120 B2 | 5/2013 | Johnson, Jr. et al. |
| 8,730,461 B2 | 5/2014 | Andreussi |
| 9,183,371 B2 | 11/2015 | Narendra et al. |
| 9,183,731 B1 | 11/2015 | Bokhary |
| 9,235,974 B2 | 1/2016 | Johnson, Jr. et al. |
| 9,250,175 B1 | 2/2016 | McManus |
| 9,494,511 B2 | 11/2016 | Wilkins |
| 9,599,529 B1 | 3/2017 | Steele et al. |
| 9,599,597 B1 | 3/2017 | Steele et al. |
| 10,023,311 B2 | 7/2018 | Lai et al. |
| 10,023,323 B1 | 7/2018 | Roberts et al. |
| 10,126,200 B1 | 11/2018 | Steele et al. |
| 10,268,198 B2 | 4/2019 | Mantripragada et al. |
| 10,325,485 B1 | 6/2019 | Schuster |
| 10,365,646 B1 | 7/2019 | Farnsworth et al. |
| 10,429,546 B1 | 10/2019 | Ulmer |
| 10,830,034 B2* | 11/2020 | Cooley ................ E21B 47/13 |
| 10,962,437 B1 | 3/2021 | Nottrott et al. |
| 11,299,268 B2 | 4/2022 | Christensen et al. |
| 11,519,855 B2 | 12/2022 | Black et al. |
| 2002/0005955 A1 | 1/2002 | Kramer et al. |
| 2003/0160174 A1 | 8/2003 | Grant et al. |
| 2003/0189711 A1 | 10/2003 | Orr et al. |
| 2003/0230716 A1* | 12/2003 | Russell .............. G01N 21/3504 |
| | | 250/339.13 |
| 2004/0012787 A1 | 1/2004 | Galle et al. |
| 2004/0017762 A1 | 1/2004 | Sogawa et al. |
| 2004/0212804 A1 | 10/2004 | Neff et al. |
| 2006/0015290 A1 | 1/2006 | Warburton et al. |
| 2006/0044562 A1 | 3/2006 | Hagene et al. |
| 2006/0232772 A1 | 10/2006 | Silver |
| 2006/0234621 A1 | 10/2006 | Desrochers et al. |
| 2007/0137318 A1 | 6/2007 | Desrochers et al. |
| 2008/0169934 A1 | 7/2008 | Lang et al. |
| 2008/0243372 A1 | 10/2008 | Bodin et al. |
| 2009/0201507 A1 | 8/2009 | Kluczynski et al. |
| 2009/0263286 A1 | 10/2009 | Isomura et al. |
| 2009/0326792 A1 | 12/2009 | McGrath |
| 2010/0004798 A1 | 1/2010 | Bodin et al. |
| 2010/0131207 A1 | 5/2010 | Lippert et al. |
| 2010/0140478 A1 | 6/2010 | Wilson et al. |
| 2010/0147081 A1 | 6/2010 | Thomas |
| 2011/0074476 A1* | 3/2011 | Heer .................... H03D 5/00 |
| | | 327/156 |
| 2011/0150035 A1 | 6/2011 | Hanson et al. |
| 2011/0164251 A1 | 7/2011 | Richter |
| 2011/0242659 A1 | 10/2011 | Eckles et al. |
| 2011/0257944 A1 | 10/2011 | Du et al. |
| 2012/0120397 A1 | 5/2012 | Furtaw et al. |
| 2013/0044314 A1 | 2/2013 | Koulikov et al. |
| 2013/0076900 A1 | 3/2013 | Mrozek et al. |
| 2013/0208262 A1 | 8/2013 | Andreussi |
| 2014/0172323 A1 | 6/2014 | Marino |
| 2014/0204382 A1 | 7/2014 | Christensen |
| 2014/0236390 A1 | 11/2014 | Mohamadi |
| 2014/0336957 A1 | 11/2014 | Hanson et al. |
| 2015/0072633 A1 | 3/2015 | Massarella et al. |
| 2015/0275114 A1 | 10/2015 | Tumiatti et al. |
| 2015/0295543 A1 | 10/2015 | Brown et al. |
| 2015/0316473 A1 | 11/2015 | Kester et al. |
| 2016/0018373 A1 | 1/2016 | Pagé et al. |
| 2016/0104250 A1 | 4/2016 | Allen et al. |
| 2016/0146696 A1 | 5/2016 | Steele et al. |
| 2016/0161456 A1 | 6/2016 | Risk et al. |
| 2016/0202225 A1 | 7/2016 | Feng et al. |
| 2016/0214715 A1 | 7/2016 | Meffert |
| 2016/0307447 A1 | 10/2016 | Johnson et al. |
| 2016/0357192 A1 | 12/2016 | McGrew et al. |
| 2017/0003684 A1 | 1/2017 | Knudsen |
| 2017/0057081 A1 | 3/2017 | Krohne et al. |
| 2017/0089829 A1 | 3/2017 | Bartholomew et al. |
| 2017/0093122 A1 | 3/2017 | Bean et al. |
| 2017/0097274 A1 | 4/2017 | Thorpe et al. |
| 2017/0115218 A1 | 4/2017 | Huang et al. |
| 2017/0134497 A1 | 5/2017 | Harter et al. |
| 2017/0158353 A1 | 6/2017 | Schmick |
| 2017/0199647 A1 | 7/2017 | Richman et al. |
| 2017/0206648 A1 | 7/2017 | Marra et al. |
| 2017/0235018 A1 | 8/2017 | Foster et al. |
| 2017/0259920 A1 | 9/2017 | Lai et al. |
| 2017/0307519 A1 | 10/2017 | Black et al. |
| 2017/0336281 A1 | 11/2017 | Waxman et al. |
| 2017/0339820 A1 | 11/2017 | Foster et al. |
| 2018/0023974 A1 | 1/2018 | Otani et al. |
| 2018/0045561 A1 | 2/2018 | Leen et al. |
| 2018/0045596 A1 | 2/2018 | Prasad et al. |
| 2018/0050798 A1 | 2/2018 | Kapuria |
| 2018/0059003 A1 | 3/2018 | Jourdainne et al. |
| 2018/0067066 A1 | 3/2018 | Giedd et al. |
| 2018/0109767 A1 | 4/2018 | Li et al. |
| 2018/0127093 A1 | 5/2018 | Christensen et al. |
| 2018/0188129 A1 | 7/2018 | Choudhury et al. |
| 2018/0259955 A1 | 9/2018 | Noto |
| 2018/0266241 A1 | 9/2018 | Ferguson et al. |
| 2018/0266946 A1 | 9/2018 | Kotidis et al. |
| 2018/0209902 A1 | 10/2018 | Myshak et al. |
| 2018/0284088 A1 | 10/2018 | Verbeck, IV |
| 2018/0292374 A1 | 10/2018 | Dittberner et al. |
| 2018/0321692 A1 | 11/2018 | Castillo-Effen et al. |
| 2018/0322699 A1 | 11/2018 | Gray et al. |
| 2019/0011920 A1 | 1/2019 | Heinonen et al. |
| 2019/0011935 A1 | 1/2019 | Ham et al. |
| 2019/0025199 A1 | 1/2019 | Koulikov |
| 2019/0033194 A1 | 1/2019 | DeFreez et al. |
| 2019/0049364 A1 | 2/2019 | Rubin |
| 2019/0077506 A1 | 3/2019 | Shaw et al. |
| 2019/0086202 A1 | 3/2019 | Guan et al. |
| 2019/0095687 A1 | 3/2019 | Shaw et al. |
| 2019/0154874 A1 | 5/2019 | Shams et al. |
| 2019/0178743 A1 | 6/2019 | McNeil |
| 2019/0195789 A1* | 6/2019 | Pan ....................... G01N 21/39 |
| 2019/0204189 A1 | 7/2019 | Mohr, Jr. et al. |
| 2019/0212419 A1 | 7/2019 | Jeong et al. |
| 2019/0220019 A1 | 7/2019 | Tan et al. |
| 2019/0228573 A1 | 7/2019 | Sen et al. |
| 2019/0234868 A1 | 8/2019 | Tanomura et al. |
| 2019/0331652 A1 | 10/2019 | Ba et al. |
| 2020/0109976 A1 | 4/2020 | Ajay et al. |
| 2020/0249092 A1 | 8/2020 | Podmore et al. |
| 2020/0400635 A1 | 12/2020 | Potyrailo et al. |
| 2021/0017926 A1 | 1/2021 | Alkadi et al. |
| 2021/0109074 A1 | 4/2021 | Smith et al. |
| 2021/0140934 A1 | 5/2021 | Smith et al. |
| 2021/0190745 A1 | 6/2021 | Buckingham et al. |
| 2021/0190918 A1 | 6/2021 | Li et al. |
| 2021/0199565 A1 | 7/2021 | John et al. |
| 2021/0247369 A1 | 8/2021 | Nottrott et al. |
| 2021/0255158 A1 | 8/2021 | Smith et al. |
| 2021/0300591 A1 | 9/2021 | Tian |
| 2021/0321174 A1 | 10/2021 | Sun et al. |
| 2021/0364427 A1 | 11/2021 | Smith et al. |
| 2021/0382475 A1 | 12/2021 | Smith et al. |
| 2022/0113290 A1 | 4/2022 | Smith et al. |
| 2022/0268952 A1 | 8/2022 | Liang et al. |

(56) References Cited

U.S. PATENT DOCUMENTS

| | | |
|---|---|---|
| 2022/0341806 A1 | 10/2022 | Miller et al. |
| 2023/0146441 A1 | 5/2023 | Donnat et al. |
| 2023/0160789 A1 | 5/2023 | Donnat et al. |
| 2023/0194487 A1 | 6/2023 | Buckingham et al. |
| 2023/0207070 A1 | 6/2023 | Donnat et al. |

FOREIGN PATENT DOCUMENTS

| | | |
|---|---|---|
| CN | 205749271 U | 11/2016 |
| CN | 106769977 A | 5/2017 |
| CN | 107703075 A | 2/2018 |
| CN | 109780452 A | 5/2019 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 1371962 B1 | 7/2011 |
| FR | 3047073 B1 | 8/2019 |
| GB | 2538563 A | 11/2016 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020086499 A1 | 4/2020 |
| WO | 2020206006 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

"Safesite Multi-Threat Detection System", Jul. 11, 2012 (Jul. 11, 2012), pp. 1-6, XP055245980.
International Search Report and Written Opinion for PCT/US19/38011 dated Sep. 9, 2019.
International Search Report and Written Opinion for PCT/US19/38015, dated Oct. 18, 2019.
International Search Report and Written Opinion for PCT/US19/44119, dated Oct. 17, 2019.
International Search Report and Written Opinion for PCT/US20/26232 dated Jun. 26, 2020.
International Search Report and Written Opinion for PCT/US20/26246 dated Jun. 29, 2020.
International Search Report and Written Opinion for PCT/US20/51696, dated Feb. 3, 2021.
International Search Report and Written Opinion for PCT/US2020/044978, dated Oct. 26, 2020.
International Search Report and Written Opinion for PCT/US2021/016821 dated Apr. 26, 2021.
International Search Report and Written Opinion for PCT/US2021/024177, dated Jun. 23, 2021.
International Search Report and Written Opinion for PCT/US2021/056708, dated Jan. 27, 2022.
International Search Report and Written Opinion for PCT/US21/42061, dated Nov. 26, 2021.
International Search Report and Written Opinion for PCT/US21/44532, dated Jan. 11, 2022.
International Search Report and Written Opinion for PCT/US21/56710, dated Feb. 23, 2022.
International Search Report and Written Opinion of PCT/US19/57305, dated Jan. 2, 2020.
International Search Report and Written Opinion of PCT/US20/54117, dated Dec. 22, 2020.
Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.
Khan, "Low Power Greenhouse Gas Sensors for Unmanned Aerial Vehicles", Remote Snse. 2012, 4, 1355-1368.
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
International Search Report and Written Opinion for PCT/US22/38951, dated Nov. 28, 2022.
Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Feb. 1, 2012), pp. 23101-23101, XP012161835, ISSN: 0034-6748, DOI: 10.1063/1.3680593.
Krings et al., Atmos. Meas. Tech., 11, 721-739, Feb. 7, 2018.
Clilverd, mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).
Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).
Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).
Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).
Miyama, Toru et al., Estimating allowable carbon emission for CO2 concentration stabilization using a GCM-based Earth system model, Geophysical Research Letters, vol. 36,L19709, doi:10.1029/2009GL039678, 2009, pp. 0094-8276 (Year:2009).
Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C. et al., Interpreting seasonal changes in the carbon balance of southern Amazonia using measurements of XCO2 and chlorophyll fluorescence from GOSAT, Geophysical Research Letters, vol. 40.2829-2833, doi: 10.1002/grl.50452, 2013 pp. 2829-2833 (Year:2013).
Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial CO2 anomalies with portable laser remote sensing and 2d tomography, The Leading Edge Mar. 2018, pp. 306-313 (Year:2018).
IEEE Conference Paper, "Research of the high pressure jet performance of small size nozzle," ISBN :978-1-5090-1087-5, Publication Date : Oct. 1, 2016, Conference dates Oct. 10, 2016 thru Oct. 12, 2016.[retrieved from the Internet] on Sep. 1, 2023 at 4:14pm.
Lilian Joly, The evolution of AMULSE: (Atmospheric Measurements by Ultra-Light Spectrometer) and its interest in atmospheric applications. Results of the Atmospheric Profiles of Greenhouse gasEs (APOGEE) weather balloon release campaign for satellite retrieval validation, p. 1-28, Sep. 25, 2019, Atmospheric Measurement Techniques Discussion (Joly).

(56) References Cited

OTHER PUBLICATIONS

International Search Report and Written Opinion for PCT/US23/13893, dated Jun. 30, 2023.
International Search Report and Written Opinion for PCT/US23/23905 mailed Oct. 5, 2023.
International Search Report and Written Opinion for PCT/US2023/023933 mailed Sep. 26, 2023.
Development of a mobile tracer correlation method for assessment of air emissions from landfills and other area sources, Atmospheric Environment 102 (2015) 323-330. T.A. Foster-Wittig et al. 2015.
Measurements of Methane Emissions from Landfills Using a Time Correlation Tracer Method Based on FTIR Absorption Spectroscopy, Environ. Sci. Technol. 2001, 35, 21-25, B. Galle et al. 2001.
Feng, Lingbing, Nowak, Gen, O'Neill, T.J., Welsh, A.H."Cutoff; A spatio-temporal imputation method." Journal of Hydrology 519 (2014) : 3591-3605 (Year:2014).
Cabreira et al. "Survey on Coverage Path Planning with Unmanned Aerial Vehicles", published: Drones, published: Jan. 2019, pp. 1-38, year 2019.

\* cited by examiner

ANALOG SIGNAL PROCESSING FOR A LIGHTWEIGHT AND COMPACT LASER-BASED TRACE GAS SENSOR

CROSS-REFERENCE TO RELATED APPLICATION

This application is a 35 U.S.C. § 371 National Stage Entry of International Application No. PCT/US2020/026228, filed Apr. 1, 2020, which claims the priority benefit of U.S. Provisional Patent Application Ser. No. 62/829,737 filed Apr. 5, 2019, all of which are incorporated herein by reference in their entirety for all purposes.

FIELD OF ENDEAVOR

The invention relates to gas detection, and more particularly to signal processing for gas detection.

BACKGROUND

Trace gas sensors are used to detect and quantify leaks of toxic gases, e.g., hydrogen disulfide, or environmentally damaging gases, e.g., methane and sulfur dioxide, in a variety of industrial and environmental contexts. Detection and quantification of these leaks are of interest to a variety of industrial operations, e.g., oil and gas, chemical production, and painting, as well as environmental regulators for assessing compliance and mitigating environmental and safety risks.

SUMMARY

A method embodiment may include: sending a laser drive signal to a trace-gas sensor; generating, by the trace-gas sensor, a raw detector signal based on a gas sample; amplifying, by an analog processing, the generated raw detector signal; locking-in, by the analog processing, the amplified detector signal; converting, by analog to digital converters, the amplified and locked-in detector signal to a digital signal; receiving, by a drive computer, the converted digital signal; and applying, by the drive computer, a spectroscopic model to the received digital signal to extract one or more properties of the gas sample.

In additional method embodiments, the laser drive signal may be sent by the drive computer and/or a first waveform generator. Additional method embodiments may include, prior to amplifying the generated raw detector signal: filtering, by the analog processing, the generated raw detector signal, where the analog processing may amplify the filtered detector signal. Additional method embodiments may include, prior to converting the detector signal: normalizing, by the analog processing, the locked-in detector signal, where the analog to digital converters may convert the amplified, locked-in, and normalized detector signal.

Additional method embodiments may include: receiving, by the analog processing, the generated raw detector signal from the trace-gas sensor, where the analog processing may normalize the lock-in detector signal based on changes in at least one of: an average magnitude of the raw detector signal and an overall magnitude of the raw detector signal. In additional method embodiments, locking-in the amplified detector signal may further include: tuning a phase of a reference signal that is being multiplied by and/or tuning a width of a low pass filter. In additional method embodiments, the tuning may be by the drive computer and/or a second waveform generator (138). Additional method embodiments may include: storing, by the drive computer, the extracted one or more properties of the gas sample in a memory.

A system embodiment may include: a trace-gas sensor, the trace-gas sensor configured to generate a raw detector signal based on a gas sample; an analog processing, the analog processing configured to at least one of: filter, amplify, lock-in, and normalize the generated raw detector signal; analog to digital converters, where the analog to digital converters are configured to convert the filtered and amplified detector signal to a digital signal; and a drive computer, the drive computer configured to: receive the converted digital signal from the analog to digital converters; and apply a spectroscopic model to the received digital signal to extract one or more properties of the gas sample.

In additional system embodiments, the drive computer may be further configured to: send a laser drive signal to the trace-gas sensor. In additional system embodiments, the drive computer may be further configured to: store the extracted one or more properties of the gas sample in a memory. In additional system embodiments, the trace-gas sensor may include a laser, a cavity, and a detector.

In additional system embodiments, the analog processing may include: an analog filter configured to filter the raw detector signal; an analog amplifier configured to amplify the filtered raw detector signal; one or more analog lock-in amplifiers configured to lock-in and amplify the filtered and amplified detector signal; and one or more analog normalizations configured to take the ratio of a post-lock-in harmonic signals. In additional system embodiments, the analog processing may include one or more integrated circuits (ICs) and/or one or more operational amplifiers (opamps). In additional system embodiments, at least one of the one or more properties of the gas sample may include: a gas concentration, a gas temperature, and a gas pressure. Additional system embodiments may include: a portable device, where the trace-gas sensor, the analog processing, the analog to digital converters, and the drive computer may be disposed on the portable device, and wherein the portable device may be at least one of: an aerial vehicle (AV), an unmanned aerial vehicle (UAV), a handheld device, and a robot-mounted device.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1A:
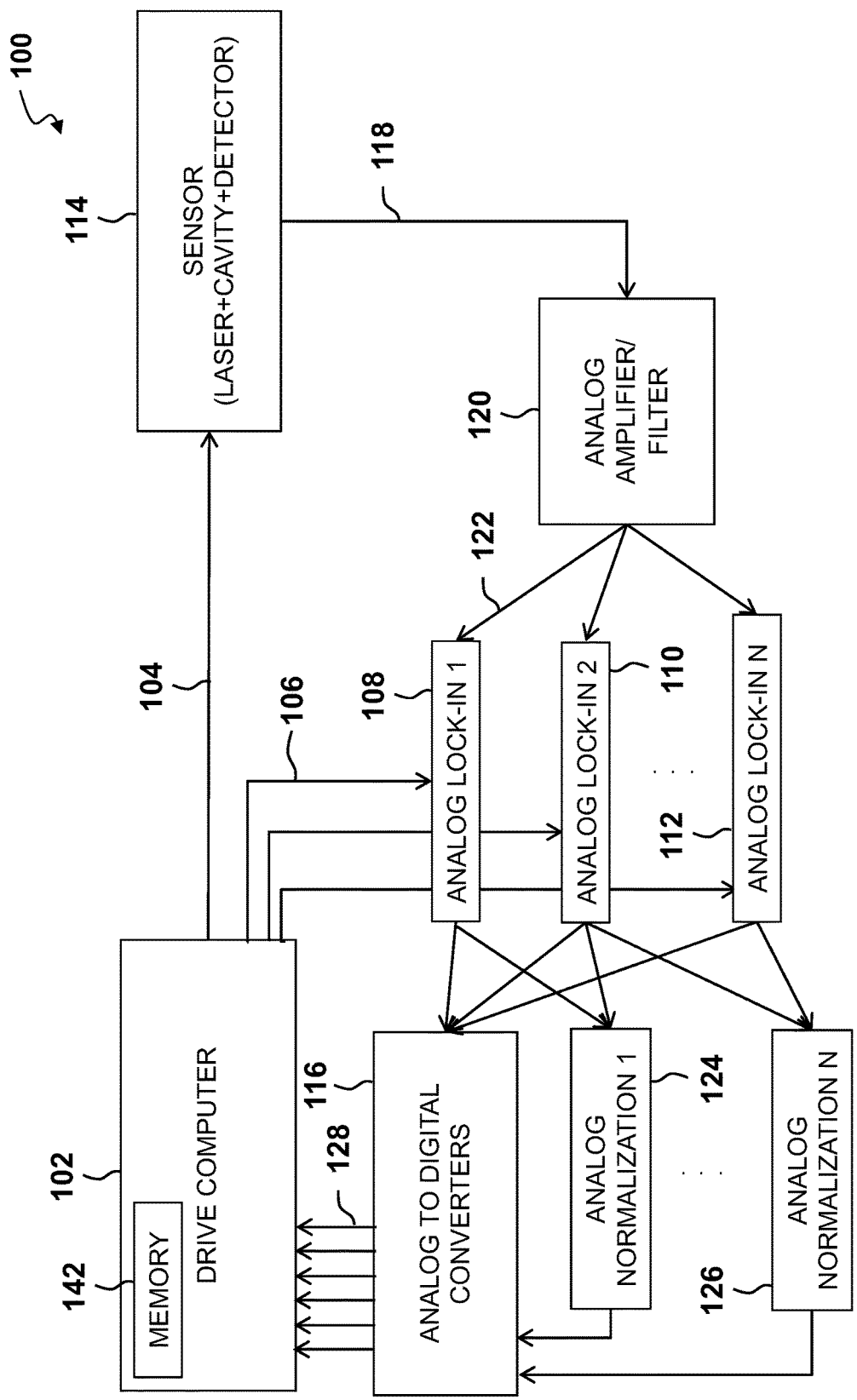
FIG. 1A depicts a high-level block diagram of a laser-based trace gas detector system, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The present system allows for analog signal processing for a lightweight and compact laser-based trace gas sensor, such as a system used on an aerial vehicle, a portable device, and/or a handheld device. The system maintains the signal in analog throughout the signal processing pipeline in order to minimize the amount of processing required until the signal has been fully processed and it may be converted into a digital signal by analog to digital converters. The disclosed system results in reduced computing and storage requirements which allows for a smaller form factor and lighter weight such that the gas sensor may be utilized on an aerial vehicle, such as an unmanned aerial vehicle (UAV) and/or a handheld device operated by a user.

Trace gas sensors detect and quantify leaks of toxic gases, e.g., hydrogen disulfide, or environmentally damaging gases, e.g., methane and sulfur dioxide, in a variety of industrial and environmental contexts. Detection and quantification of these leaks are of interest to a variety of industrial operations, e.g., oil and gas, chemical production, and painting, as well as environmental regulators for assessing compliance and mitigating environmental and safety risks.

The performance of trace gas sensors is typically described in terms of sensitivity, i.e., the lowest concentration a sensor can measure and the marginal change in concentration a sensor can measure, and specificity, i.e., how robust the concentration measurement is in a mixture of other gases. Laser-based gas detection techniques are capable of both highly sensitive and specific measurements. Laser-based measurements typically use a laser that emits at a wavelength of light that corresponds to an absorption transition of a chemical species of interest. This light is pitched across an empty space within a solid body, such as a cavity that contains the gas sample. The pitched light can either be at a fixed wavelength or it can be scanned in wavelength. A detector records how much light was transmitted across the cavity. Then, by using the Beer-Lambert relationship, which describes the transmission of light through a sample, i.e., gas in this case, as a function of sample composition and physical properties, e.g., composition, temperature, and pressure, the physical properties of the sample can be inferred.

Laser-based trace gas sensors depend heavily on knowledge of the absorption spectrum of a molecule. The absorption spectrum is understood through a quantum-physics-based model that describes the allowable transitions in the energy level of a given molecule. These allowable changes in energy levels correspond to the wavelengths of light the molecule absorbs, and the selection of the energy level transition, or wavelength of light, to use in a trace gas sensor is key to determining the sensitivity and specificity of a sensor.

Beyond the wavelength selection, sensor performance can be further improved through a variety of signal processing techniques. As described above, where a laser is pitched across a cavity is referred to as direct absorption (DA). DA measurements, while straightforward, may be susceptible to external sources of noise, such as ambient optical emission or electronics noise. A way to decrease the susceptibility of laser-based trace gas measurements to noise is to employ a common signal processing technique typically referred to as Harmonic Detection, or in the context of laser-based gas detection Wavelength Modulation Spectroscopy (WMS), whereby the laser intensity and wavelength are modulated with a carrier frequency that is in a frequency band where little ambient noise exists. This modulation shifts all of the information content of the signal that falls on the detector to the carrier wave frequency and its harmonics. A lock-in amplifier is then used to shift the information content that resides at the carrier harmonics to DC. After a low-pass filter is applied, a signal is recovered sans noise that is related to the original absorption signature of the gas. WMS measurements may be made by looking at the second and first harmonic, or the 2f and 1f signals, respectively.

While raw WMS signals—before a lock-in amplifier is applied—contain information at relatively high-frequency components, i.e., the information in the signal exists at the carrier frequency and above, processed WMS signals, i.e., post-lock-in, signals themselves are relatively limited in frequency content, and typically have information in the same frequency bands as a typical DA signal. Spectroscopic modeling and fitting enable the extraction of gas properties and concentration if about 50 data points are available throughout a DA or, post-lock-in, WMS scan. So, if scanning at 20 Hz, the acquisition rate required is around 1 kHz. By contrast, if recording the raw WMS signal, i.e., pre-lock-in, and the carrier frequency was 10 kHz, one would need to acquire data at a rate of at least 40 kHz to detect the second harmonic.

Laser-based gas sensors have been demonstrated in a plethora of applications and contexts, including but not limited to measurements of harsh combustion environments, measurements on Mars, and measurements in emergent medical situations. Laser-based trace gas sensors can readily be found in academic and government research labs, as well as in commercial labs, and in nearly every applied setting. A form of harmonic detection is utilized to increase the signal-to-noise ratio. Sensors may be commercial adaptations of lab-bench sensors. These sensors may have large pumps to move gas samples in and out of the cavity and signal processing hardware. Because WMS modulation rates may be greater than 1 kHz to avoid electronic and optical emission noise, data acquisition rates and laser drive circuits for these systems may operate at more than 10-20 times the modulation rate. Such data acquisition systems and laser drive circuits with high sampling and output rates require high-speed analog-to-digital and digital-to-analog converters and correspondingly large storage space, resulting in bulky, heavy, and power-intensive systems.

The unique sensitivity and specificity made accessible by laser-based gas sensors that utilize harmonic detection, combined with the recent availability of small, highly maneuverable, remotely piloted airborne platforms present an opportunity to detect, localize and quantify leaks at a variety of industrial sites using the system and method disclosed herein. The presence of a leak may be ascertained by flying downwind of a site and surveying for a gas of interest, or by surveying the site with a compact handheld device. If the gas of interest is detected, the leak location and quantification can be determined by subsequent surveys, each moving upstream, either on foot or by air, until the source of the leak is determined.

FIG. 1 depicts a high-level block diagram of a laser-based trace gas detector system 100, according to one embodiment. The system 100 includes a drive computer 102. The drive computer 102 may be a microcontroller, system-on-a-chip, or computer-on-a-board that outputs laser drive signals 104 and any phase references 106 needed by analog lock-in amplifiers 108, 110, 112. The drive computer 102 may also acquire digital signals from the sensor 114 in some embodiments. In some embodiments, an analog function generator could be used in lieu of the drive computer 102. The analog function generator may be an integrated circuit (IC) in some embodiments. The analog function generator may be operational amplifier (opamp) in other embodiments. The drive computer 102 may acquire and store analog signals from analog to digital converters 116. In some embodiments, a second computing device may also be used to acquire and record Wavelength Modulation Spectroscopy (WMS) and/or direct absorption (DA) signals.

The sensor 114 may output raw detector signals 118. These raw detector signals 118 are received by an analog amplifier/filter 120. The analog amplifier/filter 120 applies dedicated analog circuitry conditions to amplify and filter the raw detector signals 118. The analog amplifier/filter may utilize a set of ICs and/or op-amps to amplify and filter the raw detector signal 118. In some embodiments, the filtering by the analog amplifier/filter 120 may be optional.

The amplified and filtered signals 122 are received by the one or more analog lock-in amplifiers 108, 110, 112. The one or more analog lock-in amplifiers 108, 110, 112 perform signal processing. The one or more analog lock-in amplifiers 108, 110, 112 may include a set of ICs or op-amps that lock-in amplify the raw detector signal. There may be multiple analog lock-in amplifiers 108, 110, 112 in the system 100 to address various harmonics of the WMS.

The analog lock-in amplifiers 108, 110, 112 may multiply the amplified and filtered signals 122 by a periodic signal having an associated frequency. The amplified and filtered signals 122 and the periodic signal may be multiplied together, integrated, and have a low pass filter applied to the result. The one or more analog lock-in amplifiers 108, 110, 112 may be tuned based on the phase of a reference signal that it is being multiplied by and/or a width of a low pass filter. This tuning may be applied to the one or more analog lock-in amplifiers 108, 110, 112 based on the desired application. The drive computer 102 may provide this tuning in some embodiments. By comparison, in a digital application, i.e., non-analog, any input signals may be multiplied by two signals that are ninety degrees out of phase, such as a sine and a cosine. These two resultant signals may then be squared. Accordingly, there is no tuning of the phase in the digital application as is available in the analog devices and processes disclosed herein.

One or more analog normalizations 122, 126 may take ratios of harmonic signals. Additional analog circuitry may be used downstream of the analog lock-in amplifiers 108, 110, 112 to take ratios of harmonic signals. In some embodiments, the analog normalizations 122, 126 may be optional.

The analog to digital converters 116 converts the analog signals from the one or more analog lock-in amplifiers 108, 112, 112 and/or the one or more analog normalizations 124, 126 and converts these signals to digital signals 128. These digital signals 128 are then stored by the drive computer 102 in a memory 142. The analog to digital converters 116 may be used to convert the raw detector DA signal to the digital signal 128, which may then be recorded by the drive computer 102 or an alternative. The analog to digital converters 116 may be used to convert any or all of the analog harmonic or ratio-of-harmonic signals to digital signals 128. The analog-to-digital converters 116 may convert analog signals to be acquired by the drive computer 102. A spectroscopic model may be fit to the resulting digital signals to extract properties of the gas sample. The properties of the gas sample may include gas concentration, temperature, pressure, and the like.

A compact UAV-borne or handheld system has a substantially different set of requirements and constraints compared to a bench-top laser-based gas sensor, specifically in terms of its mass and power budgets. The data acquisition systems and laser drive circuitry typical of bench top or currently available commercially laser-based gas sensors are simply not compatible with the UAV-borne or handheld use case. Therefore, it would be an advance in the art if circuitry could be developed to allow for airborne and handheld trace-gas measurements.

The disclosed system comprises largely analog circuitry to drive the laser and condition the detector signal in the sensor 114. The system includes various integrated circuits (ICs) and computers chips for the sole purpose of making a trace-gas measurement.

A microcontroller, system-on-a-chip (SOC), or computer-on-a-board (COB) drives the system, which is referred to as the drive computer 102. An analog function generator and/or the drive computer 102 may generate the laser modulation signal and/or any phase reference(s) needed by the downstream analog lock-ins 108, 110, 112.

Signals from the detector are amplified and filtered using operational amplifiers and integrated circuits. The analog direct absorption signals are amplified and filtered and recorded by power- and mass-efficient analog-to-digital converters 116 and recorded into memory 142 by the drive computer 102.

The analog modulated direct absorption signals are processed by integrated circuits, or a combination of operational amplifiers, that act as a lock-in filter, i.e., a sampler, integrator, and filter, to detect the harmonic signals. Multiple lock-in amplifiers 108, 110, 112 or ICs may be implemented on the same board to detect multiple frequencies. Finally, analog circuitry 124, 126 may be used to normalize the post-lock-in harmonic signals. In some embodiments, the analog circuitry 124, 126 may take the ratio, i.e., divide, of post-lock-in harmonic signals. The resulting analog harmonic signals or ratios of harmonic signals are then converted to digital signals by mass- and power-efficient analog-to-digital converters 116 and recorded by the drive computer.

The drive computer 102 may apply a spectroscopic model to the received digital signal to extract one or more properties of the gas sample. The drive computer 102 may then store the extracted one or more properties of the gas sample in a memory 140. The stored one or more properties of the gas sample may be stored as gas data for later viewing, analysis, or the like. In some embodiments, the gas data may be sent to a third-party database, cloud computer, or the like for further storage and/or analysis.

By performing all the signal processing in the analog realm, the need for high digital-sampling rates is mitigated, and the need for data storage is also reduced. Once digital DA and/or WMS signals are stored, a spectroscopic model can be fit to extract species concentration and/or physical properties. This fitting can either be done onboard the drive computer 102, or it can be done offline on a different computer later. Offline processing could, for example, be done on a local desktop, or it could be performed remotely in the cloud.

Figure 1B:
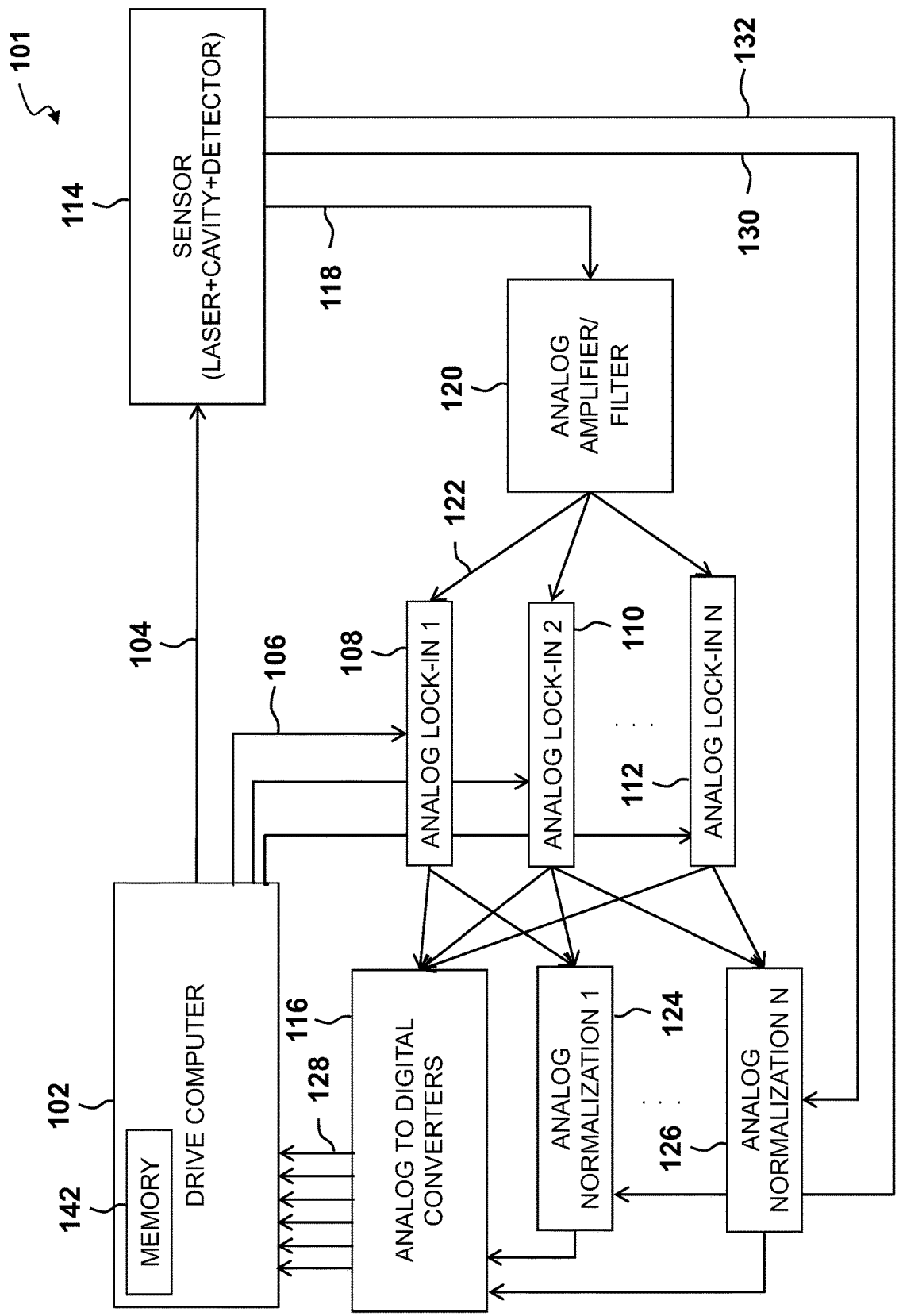
FIG. 1B depicts a high-level block diagram of an alternate laser-based trace gas detector system, according to one embodiment.

FIG. 1B depicts a high-level block diagram of an alternate laser-based trace gas detector system 101, according to one embodiment. In this alternate system 101, the analog processing 124, 126 may normalize the signal based on inputs from one or more analog lock-ins 108, 110, 112 and/or one or more raw detector signals 130, 132 from the sensor 114. Normalization, via the analog processing 124, 126, may normalize the signal to changes in the average and/or overall magnitude of the raw detector signal 130, 132. If the raw detector signal 130, 132 is fluctuating up or down then the post-lock-in harmonic signals may have some fluctuation with part of the signal being higher or lower than the rest of the signal. In an ideal environment, these fluctuations may be minimal. In a real world environment, such as a sensor 114 being flown on an aerial vehicle, changes to the laser, the presence of dust, or the like may create undesired fluctuations. Normalization, via the analog processing 124, 126, normalizes the signal to remove and/or minimize these fluctuations.

Figure 1C:
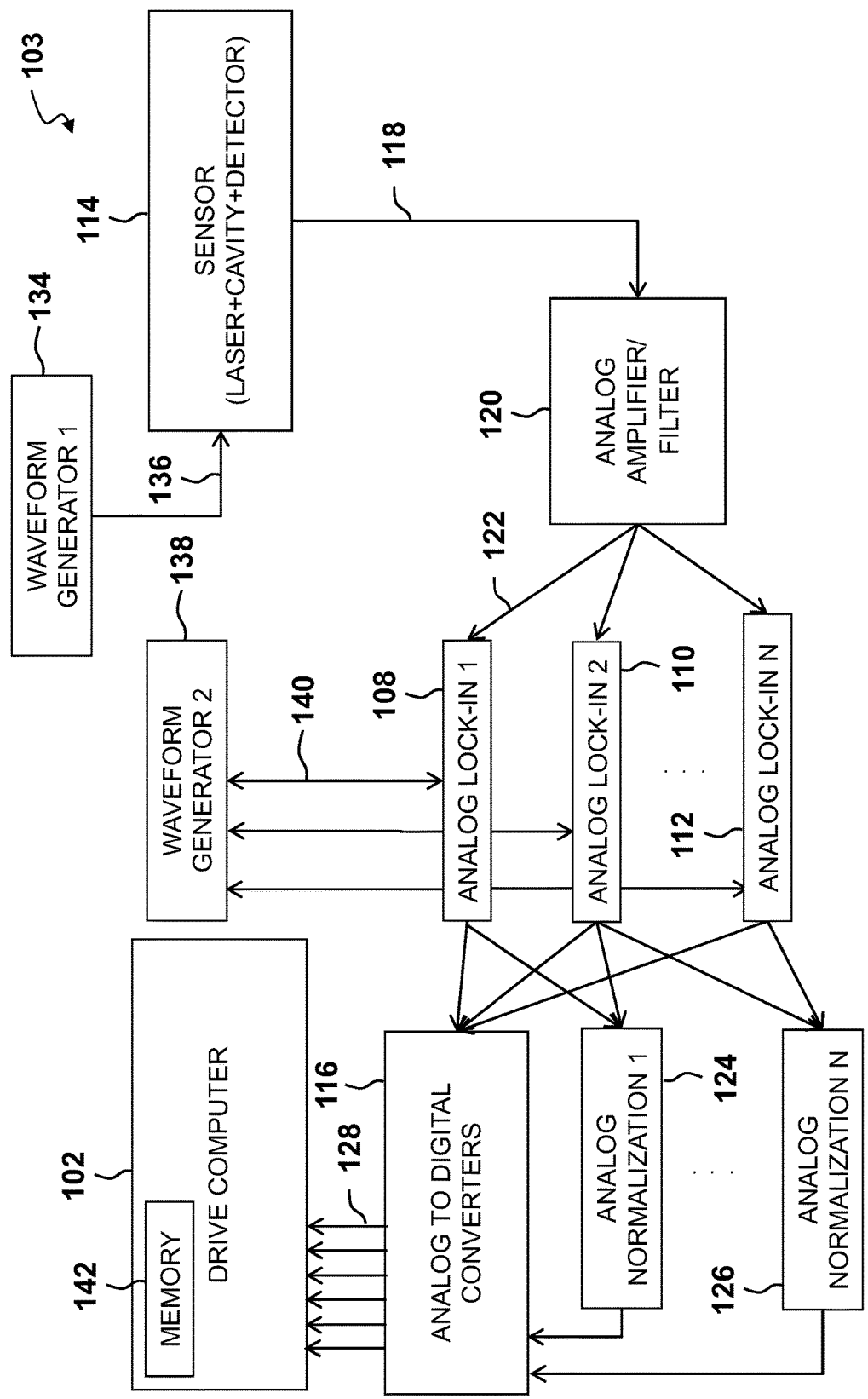
FIG. 1C depicts a high-level block diagram of an alternate laser-based trace gas detector system, according to one embodiment.

FIG. 1C depicts a high-level block diagram of an alternate laser-based trace gas detector system 103, according to one embodiment. In this alternate system 103, the sensor 114 may receive a laser drive signal 136 from a first waveform generator 134. The first waveform generator 134 may be an analog device. The first waveform generator 134 may be an oscillator. The oscillator may be an oscillating element for generating oscillatory electric currents or voltages by non-mechanical means. The oscillator may generate a waveform, such as a sine wave, that is used to drive the laser signal. In other embodiments, the sensor 114 may be driven by the first waveform generator 134 and/or the drive computer 102.

In this alternate system 103, the one or more analog lock-ins 108, 110, 112 may receive a signal 140 from a second waveform generator 138. The signal 140 may include a tuned phase of a reference signal that is being multiplied by and/or a width of a low pass filter. In some embodiments, a feedback loop may measure the magnitude of the lock-in output and then adjust the phase in the signal 140 to maximize that output. The second waveform generator 138 may be an analog device and adjustments made be made in the analog space. In some embodiments, the one or more analog lock-ins 108, 110, 112 may receive inputs from the second waveform generator 138 and/or the drive computer 102.

Figure 1D:
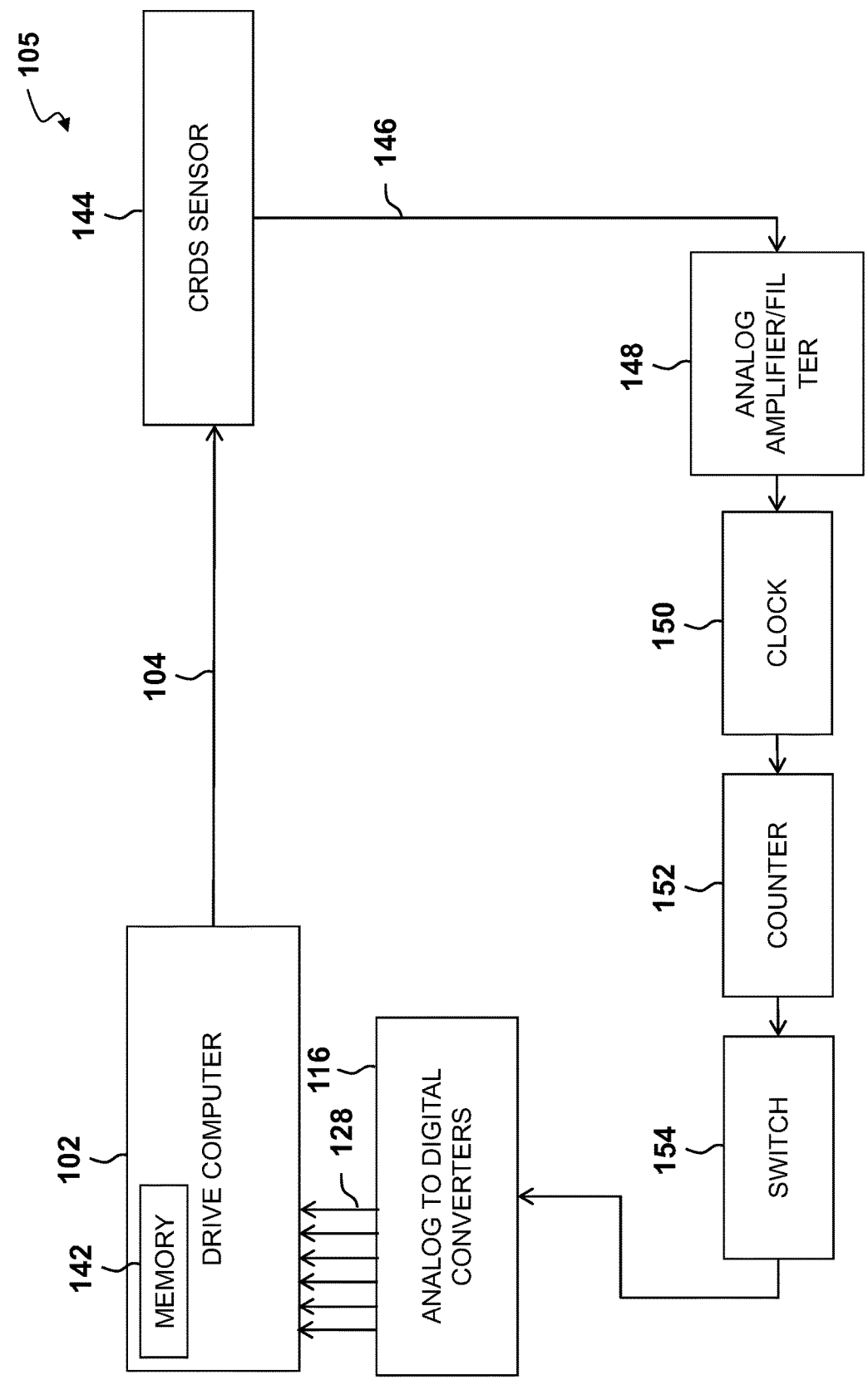
FIG. 1D depicts a high-level block diagram of an alternate laser-based trace gas detector system, according to one embodiment.

FIG. 1D depicts a high-level block diagram of an alternate laser-based trace gas detector system 105, according to one embodiment. In this alternate system 105, the sensor may be a cavity ring-down spectroscopy (CRDS) sensor 144. CRDS is a gas sensing technique using a high-finesse optical cavity. Gas properties may be determined by measuring the ring down time of said optical cavity. This alternate system 105 allows the signals to be kept in analog, rather than digital, while eliminating and/or reducing a need for high-speed sampling and the mass, power, footprint, storage, and complexity that comes with high-speed sampling in the digital space. This alternate gas detector system 105 utilizes CRDS as a spectroscopic technique and the gas detector system 105 benefits similarly from doing analog processing as with the systems described herein in FIGS. 1A-1C.

CRDS infers gas properties based on how long it takes for the cavity to be empty of light. An analog signal 146 from the CRDS sensor 144 may be processed by analog processing 148, 150, 152, 154 before being converted to a digital signal 128 via analog to digital converters 116. The analog processing 148, 150, 152, 154 may include an analog amplifier and/or filter 148; a clock 150; a counter 152; and/or a switch 154. The switch 154 may be closed or opened when the analog signal goes above or below a certain threshold. In some embodiments, other analog processing may be used to determine a time constant of the system 105.

Figure 2:
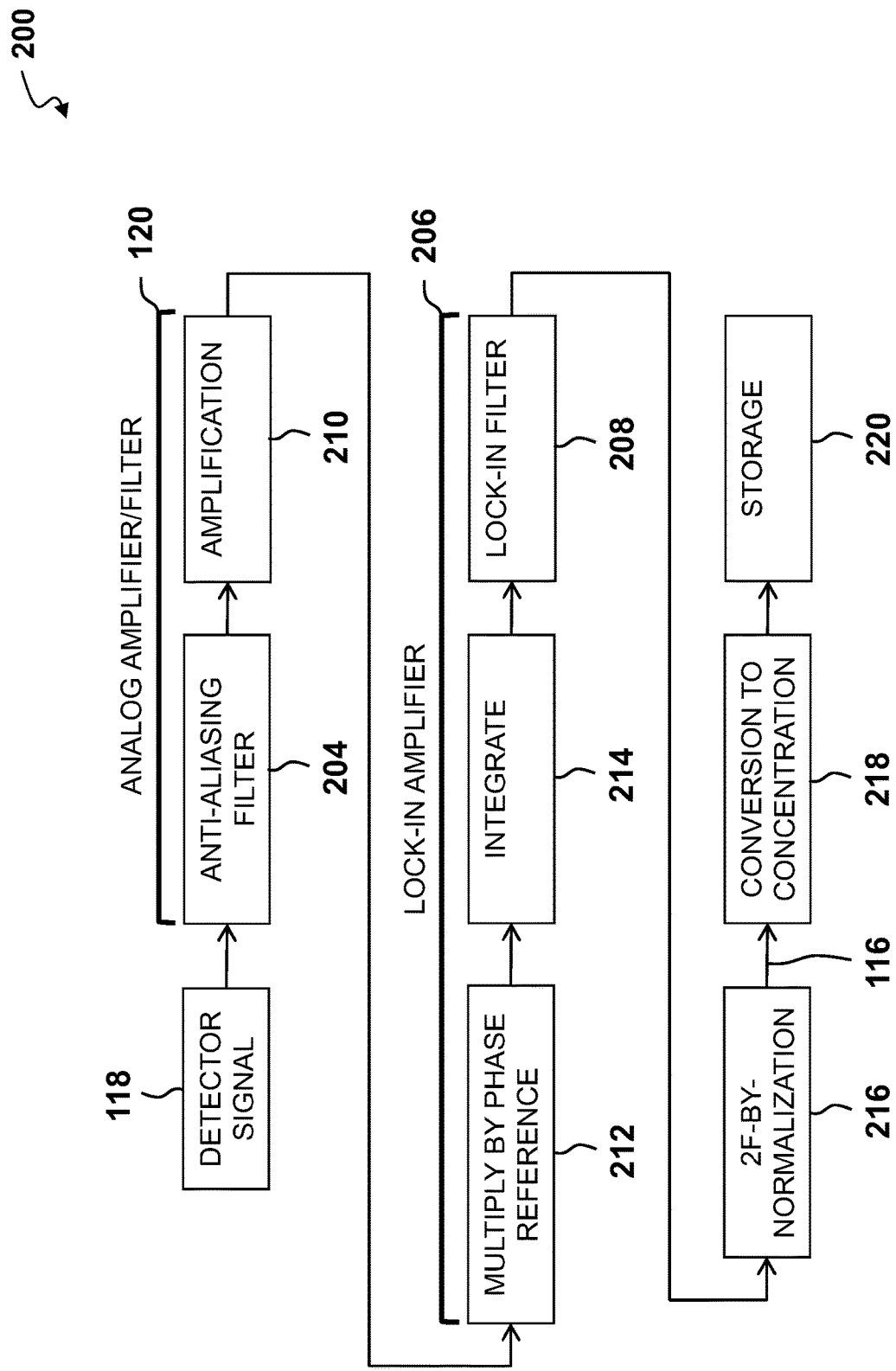
FIG. 2 depicts a high-level block diagram of a signal processing pipeline, according to one embodiment.

FIG. 2 depicts a high-level block diagram of a signal processing pipeline 200, according to one embodiment. To illustrate the tradeoffs between digitizing the signal at different points on the signal processing pipeline, several variations are presented in FIG. 2. If the frequency content in the signal extends up to four times the modulation rate fm, then the Nyquist criterion requires a sampling rate of 8*fm. As the information moves from left to right in the signal processing pipeline 200, the frequency content is reduced after each filtering step.

By digitizing immediately after the raw detector signal 118, the risk of aliasing increases. The first filtering step is an anti-aliasing filtering 204, which comprises a long-tail, low-pass filter to eliminate high-frequency noise above the Nyquist criterion. If digitizing the raw detector signal 118, the Nyquist criterion must be oversampled, requiring analog to digital converters (ADCs) capable of greater than an 8*fm sampling rate, as well as corresponding storage space for that digital signal.

If digitizing after the first filter, i.e., the anti-aliasing filter 204, then the system must only sample at two times the upper limit of the anti-aliasing filter 204. So, if the system can anti-alias perfectly at the limit of the information content, then this requires an ADC capable of converting analog signals at 8*fm.

The raw detector signal 118 goes through an anti-aliasing filter 204 and amplification 210. The signal then travels to the lock-in amplifier 206. The lock-in amplifier 206 includes multiply by phase reference 212, integrate 214, and the lock-in filter 208. The anti-aliasing filter 204 and amplification 210 may be part of the analog amplifier/filter 120. In some embodiments, the anti-aliasing filter 204 may be optional.

The next filtering operation in the signal processing pipeline occurs at the end of the lock-in amplifier 206. Until this lock-in filter 208, the information content in the signal is still 8*fm. The lock-in amplifier 206 effectively extracts all of the information in the signal that has been shifted to the modulation frequency fm and its harmonics. The width of the filter in the lock-in filter 208 depends on the details of the spectroscopy. The width of the lock-in filter 208 may be selected via trial and error. The width of the lock-in filter 208 may usually be on the order of the upper end of the frequency content in an unmodulated scan of the laser. The scanning frequency of the laser is typically 20-100 times less than the modulation frequency. In some embodiments, the scanning frequency may be twenty times less. The frequency content in the scan may extend to about a factor of two greater than the scan frequency.

So, if the scan frequency is 1/20 of the modulation frequency, and the information content extends to twice the scan frequency, the signal after the lock-in filter 208 is expected to extend to fm/20*2, or fm/10, requiring a sampling rate of fm/5 to satisfy the Nyquist criterion.

Accordingly, digitizing the signal after the lock-in amplifier 206, allows for a reduction in the sampling and storage requirements by at least a factor of forty in the disclosed system and method, compared to digitizing earlier in the signal processing pipeline. Laser-based sensors typically modulate in the kHz or MHz ranges, and so ADCs capable of sampling those raw signals upstream of the lock-in amplifier, such as Analog Devices LTC2385IUH-18#PBF, are typically a factor of two more expensive than slower ADCs, such as Analog Devices LTC2376IMS-16#PBF, and a have power requirements that are a factor of five times greater. Additionally, high-speed ADCs are typically larger and more massive. For the two ADCs referenced above, the high-speed ADC is roughly twice as large in footprint (25 mm^2 versus 12 mm^2), and roughly twice as massive. The lock-in amplifier 206 may be accomplished by the one or more analog lock-ins 108, 110, 112, such as shown in FIG. 1A.

The signal then goes to 2f-by-normalization 216, conversion to concentration 218, and storage 220. The normalization 216 may be accomplished by the one or more analog normalizations 124, 126, such as shown in FIG. 1A. The analog signal from normalization 216 may be converted by analog to digital converters 116 prior to conversion to concentration 218. The drive computer 102, as shown in FIG. 1A, may effect conversion to concentration 218. The results, such as extracted one or more properties of the gas sample, may be stored in storage 220 by the drive computer in a memory.

Such improvements in mass, power, and footprint are critical when developing such sensors for and deploying them on both aerial and handheld platforms. Mass and power are directly tied to an aerial platform's range and duration capability, and optimizing the payload for this is paramount in providing maximum utility. A handheld platform must be user-friendly, and optimizing the sensor in terms of its mass, power, size, and weight are critical in maximizing the usability and user experience.

Figure 3:
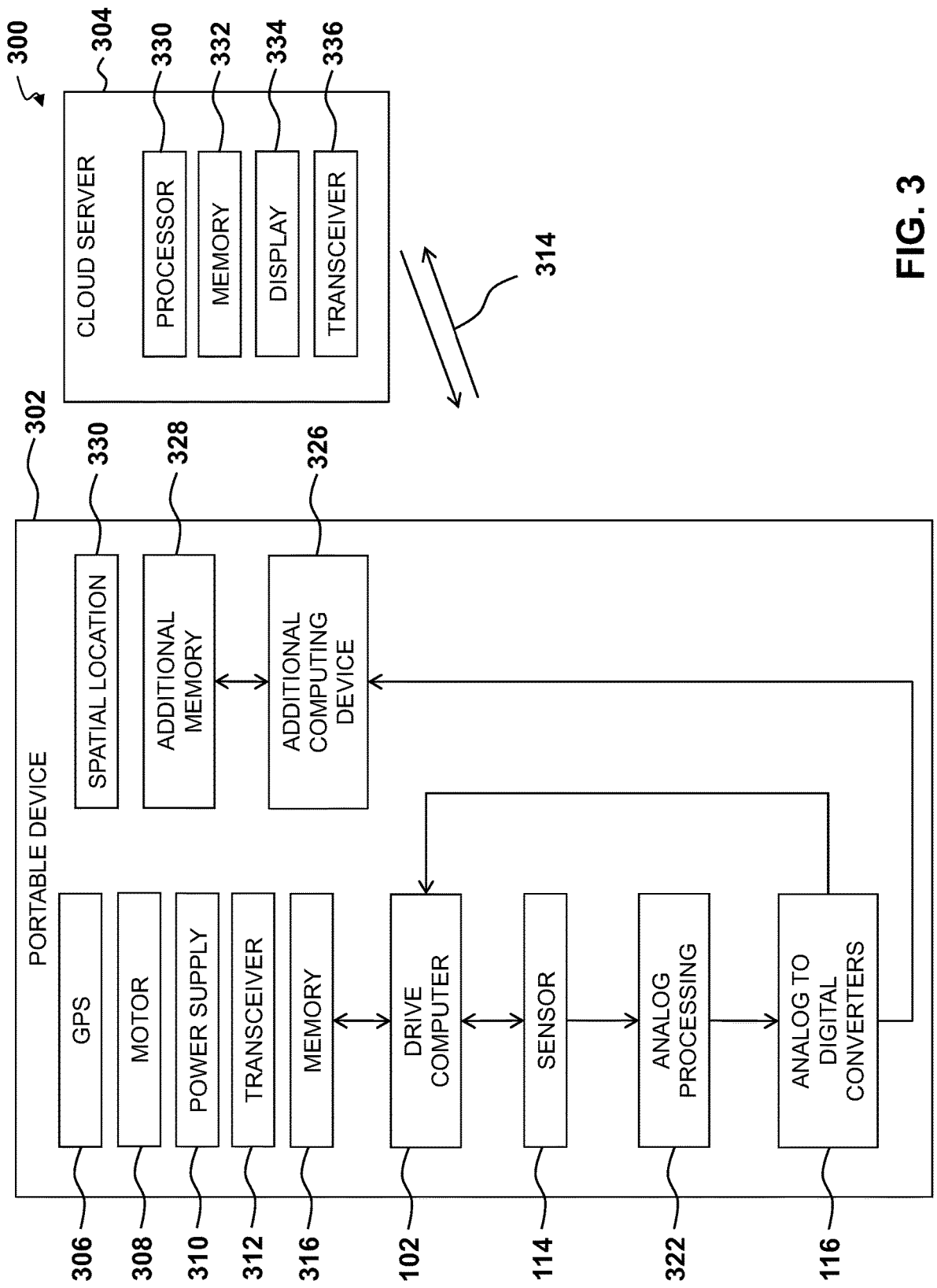
FIG. 3 depicts a high-level block diagram of a portable laser-based trace gas detector system, according to one embodiment.

FIG. 3 depicts a high-level block diagram of a portable laser-based trace gas detector system 300, according to one embodiment. The system may include a portable device 302 such as an aerial vehicle (AV), an unmanned aerial vehicle (UAV), a handheld device, a robot-mounted device, or the like. The portable device 302 may include a GPS 306 for determining a position of the portable device 302 and any gas samples obtained by the system 300. The aerial vehicle may also include one or more motors 308, a power supply 310, and a transceiver 312. The flight time of the aerial vehicle may be limited by the power supply 310, efficiency of the motors 308, and/or weight of the portable device 302.

Accordingly, it is preferable to minimize the weight of the system 300 on the aerial vehicle so as to prolong the time that the portable device 302 is available to fly and take gas measurements. A drive computer 102 may be in communication with an addressable memory 316 and a sensor 114. The drive computer 102 may send a laser drive signal to the sensor 114. The sensor 114 may include a laser, a cavity, and/or a detector. The sensor 114 may generate a raw detector signal. Analog processing 322, such as operational amplifiers and integrated circuits, may filter and/or amplify the raw detector signal. Analog to digital converters 116 may convert the processed signal into a digital signal and send it to the drive computer 102 and/or an additional computing device 326. The additional computing device 326 may be in communication with an additional addressable memory 328.

In some embodiments, the portable device 302 transceiver 312 may communicate 314 with a cloud server 304, such as a server external to the aerial vehicle 300. The cloud server 304 may have a processor 330 with addressable memory 332, a display 334, and/or a transceiver 336. The drive computer 102, additional computing device 326, and/or processor 330 of the cloud server may apply one or more spectroscopic models to the digital signal to extract one or more properties of the gas sample. In some embodiments, the portable device 302 may include a spatial location 330. The spatial location 330 may include a GPS, a cell tower triangulation, a beacon, or the like for tracking, maintaining, and/or storing a location of the portable device 302.

Figure 4:
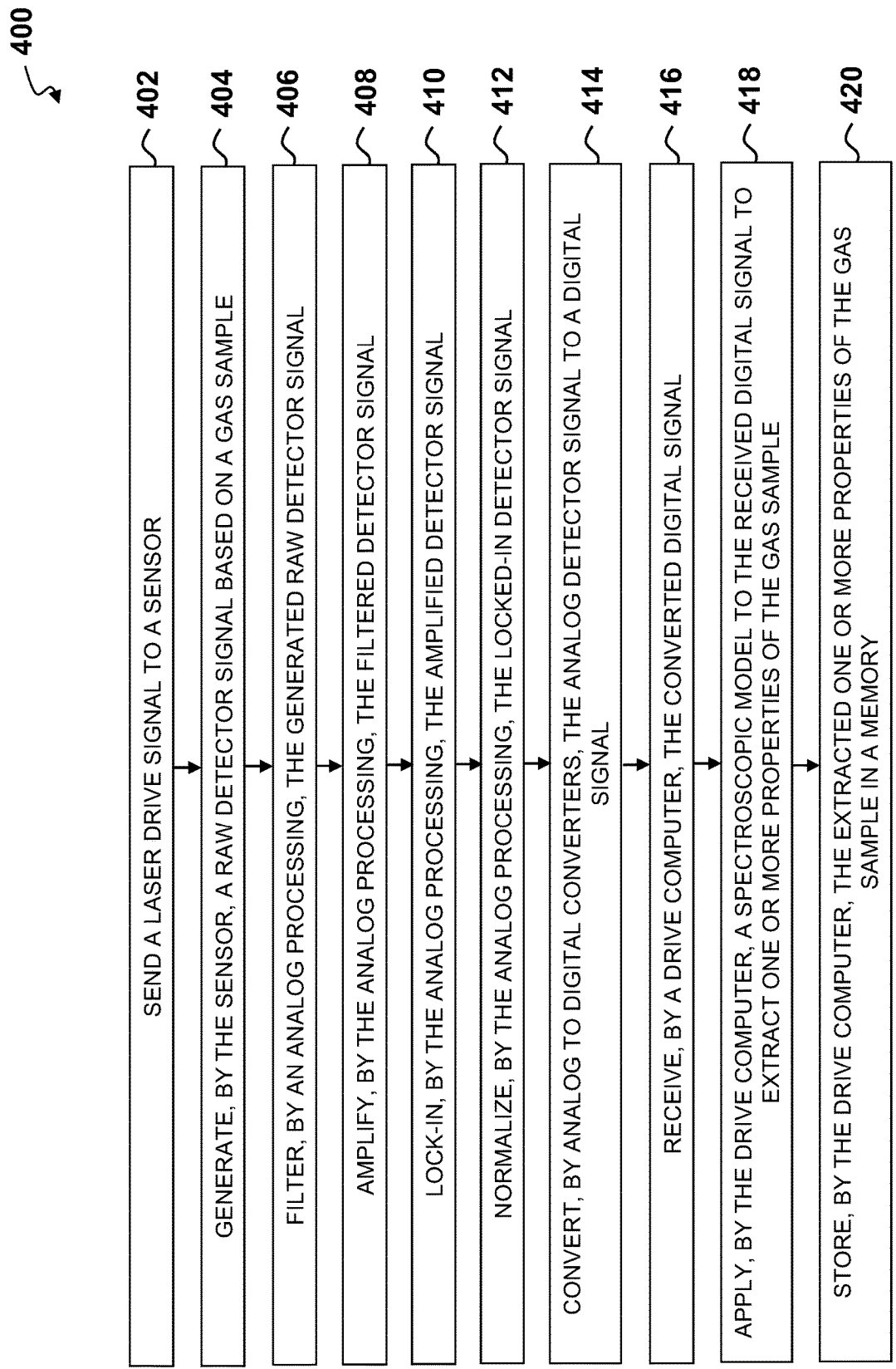
FIG. 4 depicts a high-level flowchart of a method embodiment of detecting one or more properties of a gas sample via a portable laser-based trace gas detector system, according to one embodiment.

FIG. 4 depicts a high-level flowchart of a method embodiment 400 of detecting one or more properties of a gas sample via a portable laser-based trace gas detector system, according to one embodiment. The method 400 may include sending a laser drive signal to a sensor (step 402). The laser drive signal may be sent by a drive computer and/or a waveform generator, such as an analog waveform generator. The method 400 may then include generating, by the sensor, a raw detector signal based on a gas sample (step 404).

The method 400 may then include filtering, by an analog processing, the generated raw detector signal (step 406). In some embodiments, filtering the generated raw detector signal may be optional. The method 400 may then include amplifying, by the analog processing, the generated raw detector signal (step 408). In some embodiments, the filtering may be omitted and the generated raw detector signal may be amplified directly. The method 400 may then include locking-in, by the analog processing, the amplified detector signal (step 410). The analog lock-ins may receive a signal from the drive computer and/or an analog waveform generator. This signal may be tuned based on the phase of the reference signal that is being multiplied by and/or the width of the low pass filter. The method 400 may then include normalizing, by the analog processing, the locked-in detector signal (step 412). Analog circuitry may be used to normalize the post-lock-in harmonic signals. In some embodiments, the analog circuitry 124, 126 may take the ratio, i.e., divide, of post-lock-in harmonic signals. The analog circuitry may normalize the signal based on inputs from one or more analog lock-ins and/or one or more raw detector signals from the sensor. Normalization, via the analog circuitry, may normalize the signal to changes in the average and/or overall magnitude of the raw detector signal. In some embodiments, the normalization may be omitted.

The method 400 may then include converting, by analog to digital converters, the filtered, amplified, and/or normalized analog detector signal to a digital signal (step 414). The method 400 may then include receiving, by the drive computer, the converted digital signal (step 416). The method 400 may then include applying, by the drive computer, a spectroscopic model to the received digital signal to extract one or more properties of the gas sample (step 418). In some embodiments, the method 400 may then include storing the extracted one or more properties of the gas sample (step 420). The stored one or more properties of the gas sample may be stored as gas data for later viewing, analysis, or the like. In some embodiments, the gas data may be sent to a third-party database, cloud computer, or the like for further storage and/or analysis.

Figure 5:
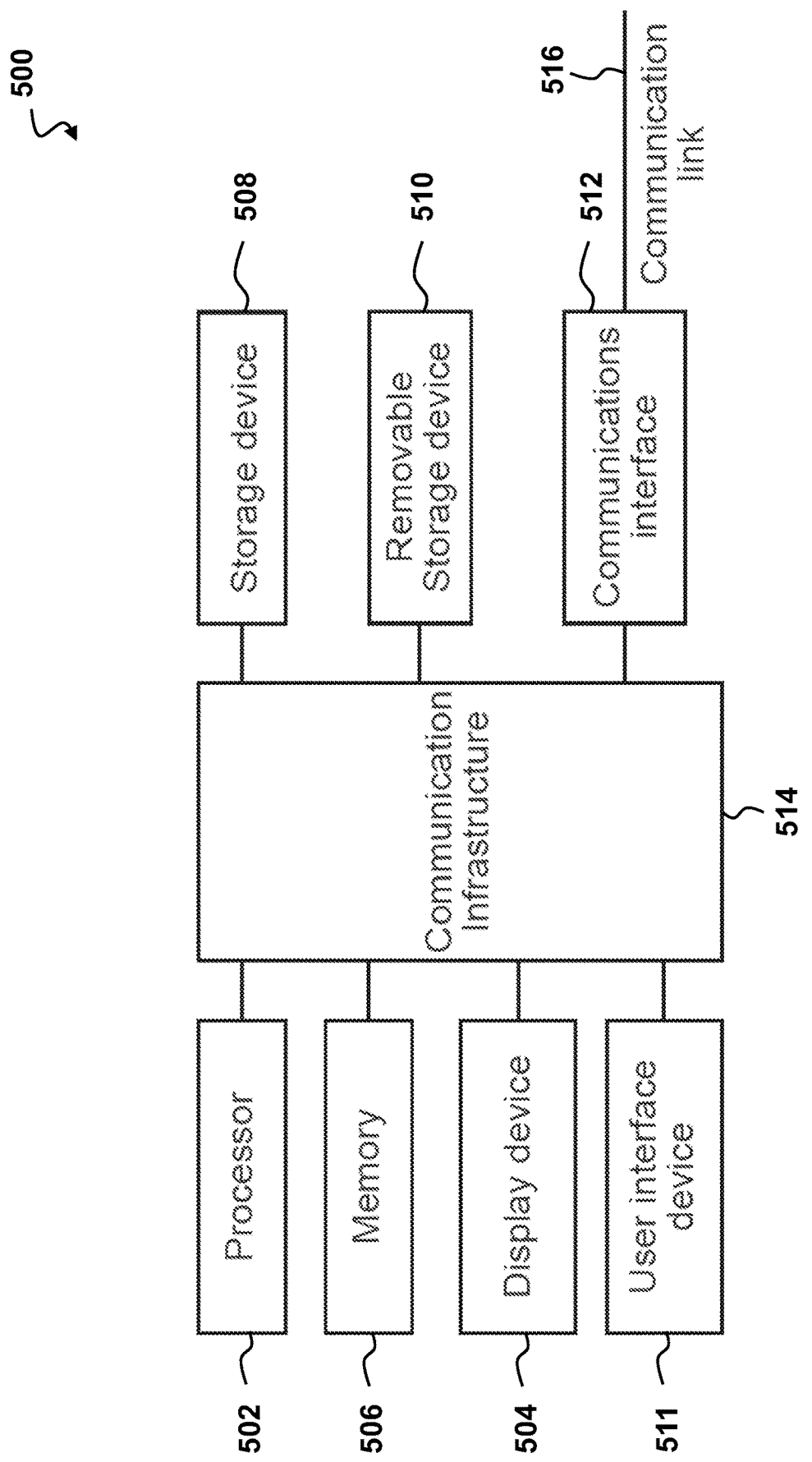
FIG. 5 shows a high-level block diagram and process of a computing system for implementing an embodiment of the system and process.

FIG. 5 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices and modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 6:
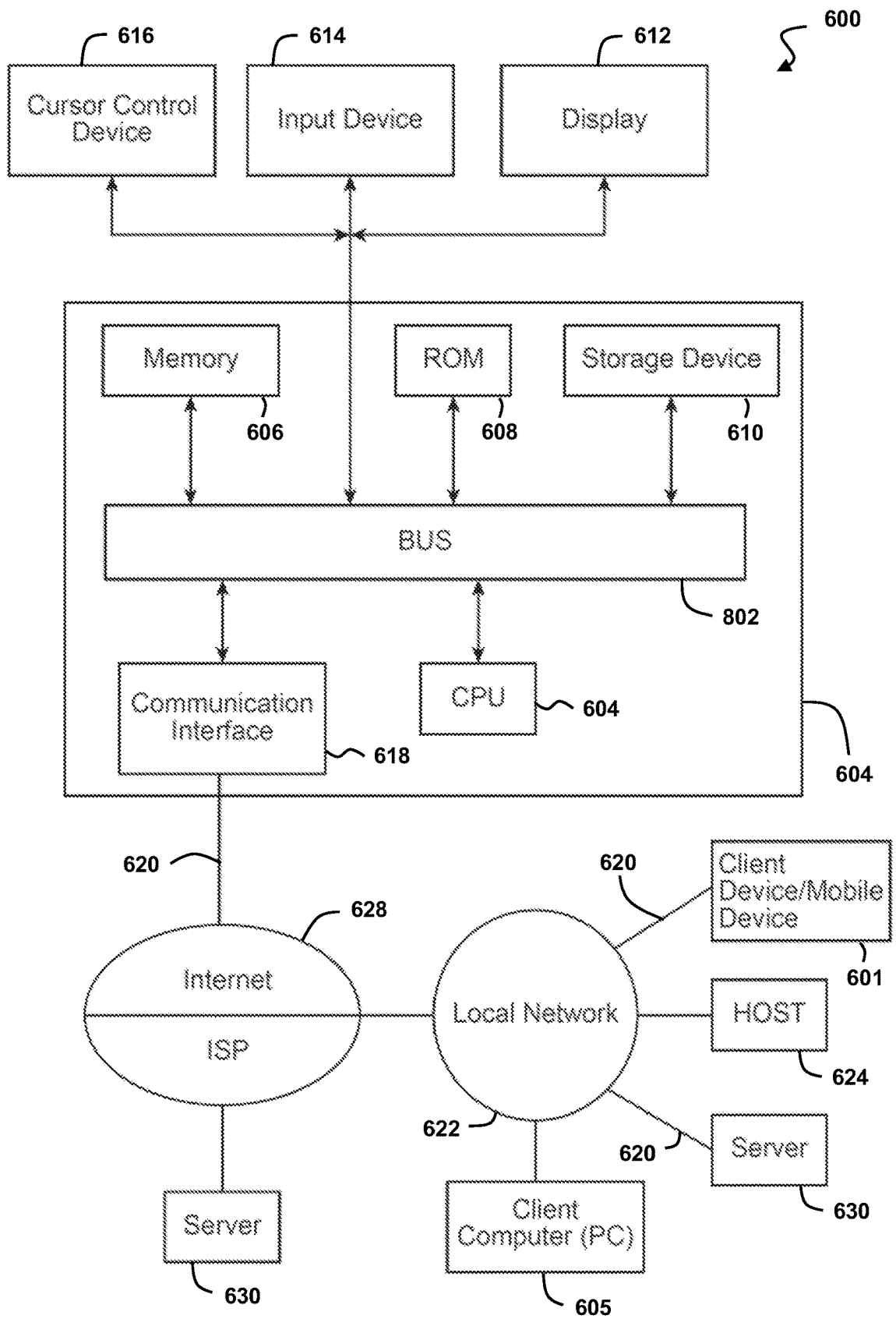
FIG. 6 shows a block diagram and process of an exemplary system in which an embodiment may be implemented.

FIG. 6 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, wherein a user can utilize one or more computers 605 to manage data in the server 630.

Figure 7:
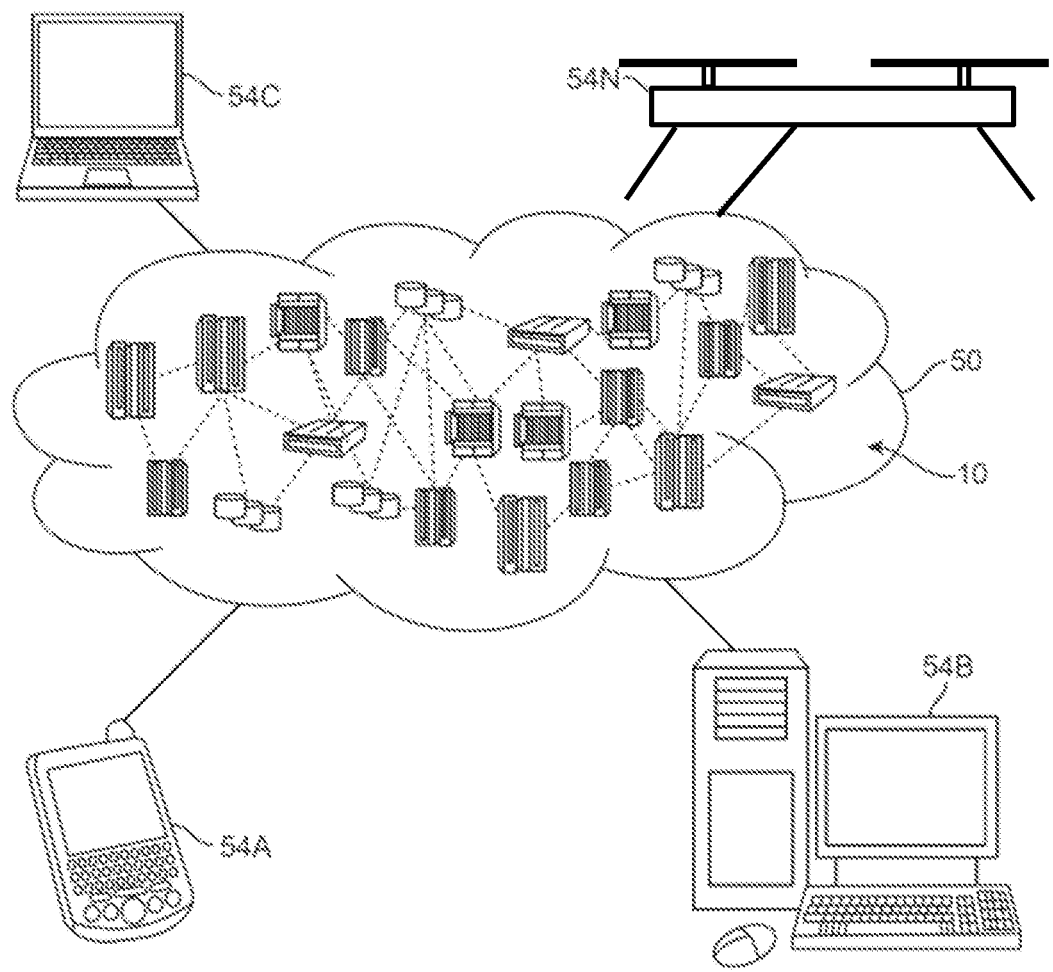
FIG. 7 depicts a cloud computing environment for implementing an embodiment of the system and process disclosed herein.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or UAV 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method comprising:
   generating, by a trace-gas sensor, a raw detector signal based on detecting a trace gas in a gas sample;
   locking-in, by an analog processing module, the detector signal to generate a locked-in detector signal;
   normalizing, by the analog processing module, the locked-in detector signal to generate a normalized detector signal;
   converting the normalized detector signal to a digital signal; and
   extracting one or more properties of the gas sample based on the digital signal.

2. The method of claim 1, wherein the raw detector signal is modulated.

3. The method of claim 1, wherein the raw detector signal is unmodulated.

4. The method of claim 1 further comprising:
   generating a laser drive signal by a waveform generator, wherein the trace-gas sensor utilizes the laser drive signal for detecting the trace gas.

5. The method of claim 1 further comprising, prior to locking-in the generated raw detector signal:
   filtering, by the analog processing module, the raw detector signal.

6. The method of claim 1, wherein normalizing the locked-in detector signal further comprises:
   normalizing the locked-in detector signal based on changes in at least one of: an average magnitude of the raw detector signal and an overall magnitude of the raw detector signal.

7. The method of claim 1, wherein locking-in the detector signal further comprises:
   locking-in the detector signal based on a reference signal; and
   tuning based on a phase of the reference signal.

8. The method of claim 1, wherein locking-in the detector signal further comprises:
   locking-in the detector signal utilizing an analog lock-in amplifier, and tuning based on a width of a low pass filter.

9. The method of claim 1, wherein locking-in the detector signal further comprises utilizing an analog lock-in amplifier and the tuning the lock-in amplifier by a waveform generator.

10. The method of claim 1, wherein extracting one or more properties of the gas sample further comprises:
    applying a spectroscopic model to the digital signal to extract one or more properties of the gas sample.

11. The method of claim 1, wherein normalizing the locked-in detector signal further comprises:
    normalizing the locked-in detector signal based on the raw detector signal to generate the normalized detector signal.

12. A system comprising:
    a trace-gas sensor configured to generate a raw detector signal based on detecting a gas sample;
    an analog lock-in amplifier configured to: lock-in the detector signal to generate a locked-in detector signal;
    an analog normalizer configured to normalize the locked-in detector signal to generate a normalized detector signal;
    an analog to digital converter configured to convert the normalized detector signal to a digital signal; and
    a driver configured to extract one or more properties of the gas sample based on the digital signal.

13. The system of claim 12, wherein the raw detector signal is at least one of: modulated and unmodulated.

14. The system of claim 12, wherein the driver is configured to apply a spectroscopic model to the digital signal to extract one or more properties of the gas sample.

15. The system of claim 12, wherein:
    the trace-gas sensor comprises a laser trace-gas sensor; and
    wherein the system further comprises:
        an analog filter configured to filter the raw detector signal to generate a filtered signal;
        a plurality of analog lock-in amplifiers, wherein each analog lock-in amplifier is configured to lock-in the filtered signal based on a respective reference signal and generate a locked-in signal;
        a plurality of analog normalization blocks, wherein each analog normalization block is configured to receive one or more locked-in signals and generate an analog normalized signal;
        a plurality of analog to digital converters, wherein each analog to digital converter is configured to convert an analog normalized signal to a digital normalized signal; and
        the driver comprises a drive computer configured to receive multiple digital normalized signals and extract one or more properties of the gas sample based on the digital normalized signals.

16. A system comprising:
    an aerial vehicle comprising:
        a trace-gas sensor configured to generate a raw detector signal based on detecting a gas sample;
        an analog lock-in amplifier configured to: lock-in the detector signal to generate a locked-in detector signal;
        an analog normalizer configured to normalize the locked-in detector signal to generate a normalized detector signal;
        an analog to digital converter configured to convert the normalized detector signal to a digital signal; and
        a driver configured to extract one or more properties of the gas sample based on the digital signal.

17. The system of claim 16, wherein the aerial vehicle further comprises:
    a global positioning system (GPS) configured to determine a position of the aerial vehicle and the detected gas sample.

18. The system of claim 16, wherein the raw detector signal is at least one of: modulated and unmodulated.

19. The system of claim 16, wherein the driver is configured to apply a spectroscopic model to the digital signal to extract one or more properties of the gas sample.

20. The system of claim 16, wherein:
the trace-gas sensor comprises a laser trace-gas sensor; and
wherein the aerial vehicle further comprises:
  an analog filter configured to filter the raw detector signal to generate a filtered signal;
  a plurality of analog lock-in amplifiers, wherein each analog lock-in amplifier is configured to lock-in the filtered signal based on a respective reference signal and generate a locked-in signal;
  a plurality of analog normalization blocks, wherein each analog normalization block is configured to receive one or more locked-in signals and generate an analog normalized signal;
  a plurality of analog to digital converters, wherein each analog to digital converter is configured to convert an analog normalized signal to a digital normalized signal; and
  the driver comprises a drive computer configured to receive multiple digital normalized signals and extract one or more properties of the gas sample based on the digital normalized signals.

* * * * *